(12) United States Patent
Ikura et al.

(10) Patent No.: US 12,021,428 B2
(45) Date of Patent: Jun. 25, 2024

(54) ROTATING ELECTRIC MACHINE

(71) Applicant: Mitsubishi Electric Corporation, Tokyo (JP)

(72) Inventors: Yutaka Ikura, Tokyo (JP); Fumitaka Totsuka, Tokyo (JP); Shoichiro Nishitani, Tokyo (JP); Akifumi Miyake, Tokyo (JP); Kohei Kawata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 680 days.

(21) Appl. No.: 17/056,082

(22) PCT Filed: Jul. 25, 2018

(86) PCT No.: PCT/JP2018/027976
§ 371 (c)(1),
(2) Date: Nov. 17, 2020

(87) PCT Pub. No.: WO2020/021664
PCT Pub. Date: Jan. 30, 2020

(65) Prior Publication Data
US 2021/0211009 A1   Jul. 8, 2021

(51) Int. Cl.
*H02K 3/52* (2006.01)
*H02K 1/278* (2022.01)

(52) U.S. Cl.
CPC ............ *H02K 3/522* (2013.01); *H02K 1/278* (2013.01); *H02K 2203/09* (2013.01)

(58) Field of Classification Search
CPC ....... H02K 3/50; H02K 3/505; H02K 2203/09

USPC ........................................................ 310/195
See application file for complete search history.

(56) References Cited

U.S. PATENT DOCUMENTS

| 2003/0090166 | A1 | 5/2003 | Kobayashi et al. |
| 2003/0201688 | A1 | 10/2003 | Yamamura et al. |
| 2007/0232094 | A1 | 10/2007 | Hoshika |
| 2015/0137637 | A1* | 5/2015 | Jang .............. H02K 3/522 |
| | | | 29/598 |

FOREIGN PATENT DOCUMENTS

| JP | 2003-324883 A | 11/2003 |
| JP | 3733313 B2 | 1/2006 |
| JP | 2007-267569 A | 10/2007 |
| JP | 2008-312277 A | 12/2008 |
| JP | 2008312277 A * | 12/2008 |

(Continued)

OTHER PUBLICATIONS

Machine translation of JP-2009124927-A (Year: 2009).*

(Continued)

*Primary Examiner* — Daniel C Puentes
*Assistant Examiner* — Minki Chang
(74) *Attorney, Agent, or Firm* — Sughrue Mion, PLLC; Richard C. Turner

(57) ABSTRACT

A rotating electric machine to which the present invention is applied includes: a plurality of coils provided in a stator for respective phases; a plurality of bus bars having elasticity, which are provided for the respective phases and connected to the plurality of coils; and a holder including a plurality of insertion portions each having a groove shape formed to deform each of the plurality of bus bars.

12 Claims, 14 Drawing Sheets

(56) References Cited

FOREIGN PATENT DOCUMENTS

JP          2009-124927  A          6/2009
JP           2009124927  A   *      6/2009

OTHER PUBLICATIONS

Machine translation of JP-2008312277-A (Year: 2008).*
Notice of Reasons for Refusal dated Feb. 1, 2022 from the Japanese Patent Office in Japanese Application No. 2020-531901.
International Search Report for PCT/JP2018/027976 dated Oct. 2, 2018 [PCT/ISA/210].
Written Opinion for PCT/JP2018/027976 dated Oct. 2, 2018 [PCT/ISA/237].

* cited by examiner

ROTATING ELECTRIC MACHINE

CROSS REFERENCE TO RELATED APPLICATIONS

This application is a National Stage of International Application No. PCT/JP2018/027976 filed Jul. 25, 2018.

TECHNICAL FIELD

The present invention relates to a rotating electric machine to be used as, for example, a motor or a power generator.

BACKGROUND ART

In a rotating electric machine to be used as, for example, a motor or a power generator, coils are provided for respective phases, and the coils provided for the respective phases are connected to associated bus bars, respectively. The bus bars prepared for the respective phases are held in a holder. Accordingly, in the holder, insertion portions each having a groove shape are formed for the respective bus bars. The bus bars are inserted into the insertion portions. Typically, the insertion portions are formed in, for example, a concentric manner so as to surround a shaft of a rotor (see, for example, Patent Literature 1).

Typically, an overall sectional shape of the insertion portion having the groove shape, more specifically, the overall sectional shape thereof taken along a plane including a short-side direction of an opening and an insertion direction of the bus bar is a U shape, and one surface of the insertion portion is an opening. Accordingly, the bus bar can be inserted from the opening.

CITATION LIST

Patent Literature

[PTL 1] JP 2003-324883 A

SUMMARY OF INVENTION

Technical Problem

In view of manufacturing the holder, the sectional shape of the insertion portion is widest in the opening, and becomes narrower from the opening toward a deep side of the insertion portion. Accordingly, the bus bar inserted in the insertion portion is liable to slip out of the insertion portion. When the bus bar is liable to slip out of the insertion portion, that is, when the bus bar is not held in the holder stably, working efficiency is lowered at the time of assembly of the rotating electric machine, and frequency of maintenance is increased after the assembly. Therefore, it is important that the bus bar is held in the holder more stably.

The present invention has been made in order to solve the above-mentioned problem, and has an object to provide a rotating electric machine capable of holding bus bars in a holder more stably.

Solution to Problem

According to one embodiment of the present invention, there is provided a rotating electric machine, including: a plurality of coils provided in a stator for respective phases; a plurality of bus bars having elasticity, which are provided for the respective phases and connected to the plurality of coils; and a holder including a plurality of insertion portions each having a groove shape formed to deform each of the plurality of bus bars.

Advantageous Effects of Invention

According to the present invention, the bus bars in the rotating electric machine can be held in the holder more stably.

DESCRIPTION OF EMBODIMENTS

Now, a rotating electric machine according to embodiments of the present invention is described with reference to the drawings. Here, components that are the same as or correspond to each other are denoted by the same reference symbols.

First Embodiment

Figure 1:
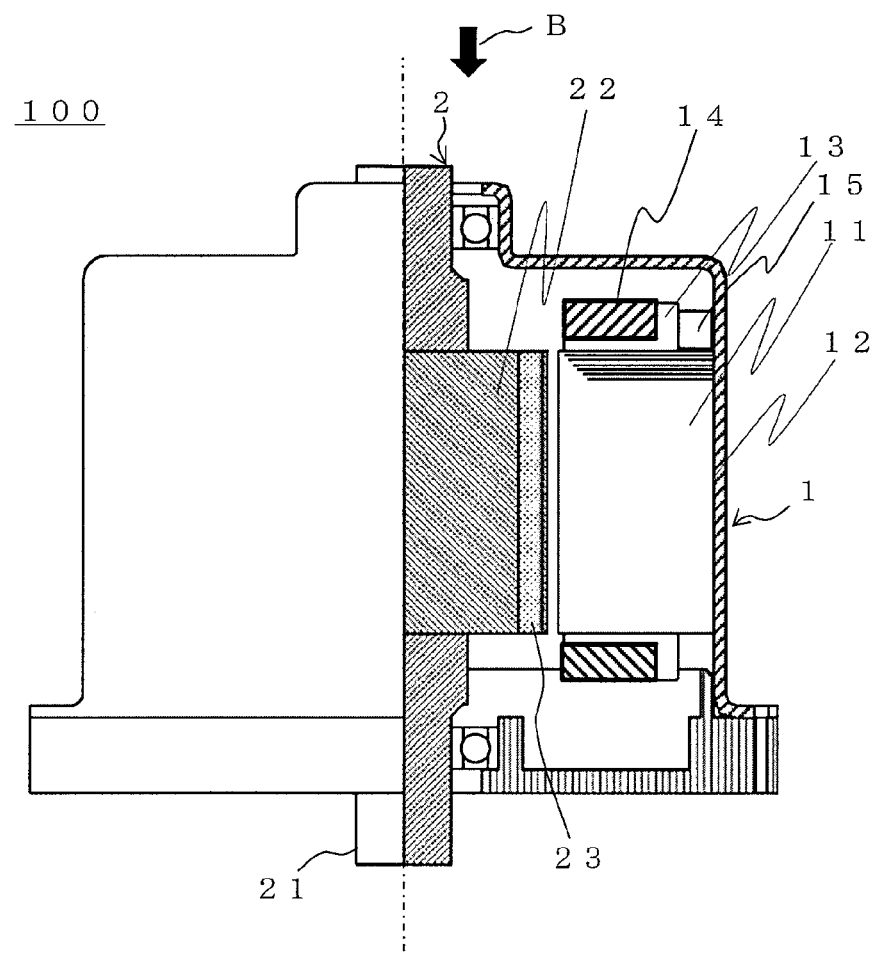
FIG. 1 is a semi-sectional view for illustrating a rotating electric machine according to a first embodiment of the present invention.

FIG. 1 is a semi-sectional view for illustrating a rotating electric machine according to a first embodiment of the present invention. A rotating electric machine 100 according to the first embodiment is a device to be used as at least one of a motor and a power generator. As illustrated in FIG. 1, the rotating electric machine 100 includes a stator 1 and a rotor 2.

The rotor 2 is a structure configured to convert electrical energy into kinetic energy, or convert kinetic energy into electrical energy. As illustrated in FIG. 1, the rotor 2 includes a shaft 21, a rotor core 22, and permanent magnets 23.

The shaft 21 is a rotary component to be used for transmission of the kinetic energy. The kinetic energy is at least one of energy generated by the rotating electric machine 100, and energy generated outside the rotating electric machine 100. The rotor core 22 is mounted to an outer side of the shaft 21, and the permanent magnets 23 are mounted to an outer side of the rotor core 22. The plurality of permanent magnets 23 are mounted to the rotor core 22.

The stator 1 is a structure configured to rotate the rotor 2, or generate electric power through the rotating rotor 2. As illustrated in FIG. 1, the stator 1 includes a stator core 11, a frame 12, bobbins 13, coils 14, and a wire connection plate unit 15.

The bobbins 13 are mounted to the stator core 11, and the coils 14 are wound around the bobbins 13, respectively. At least one coil 14 is provided for each phase. The wire connection plate unit 15 is a structure configured to supply electric power to the coils 14, or output electric power from the coils 14, and is provided at an end portion of the rotating electric machine 100 in the frame 12. End portions of the coils 14 wound around the stator core 11 through intermediation of the bobbins 13 are arranged along an axial direction of the shaft 21, and are connected to the wire connection plate unit 15.

Figure 2:
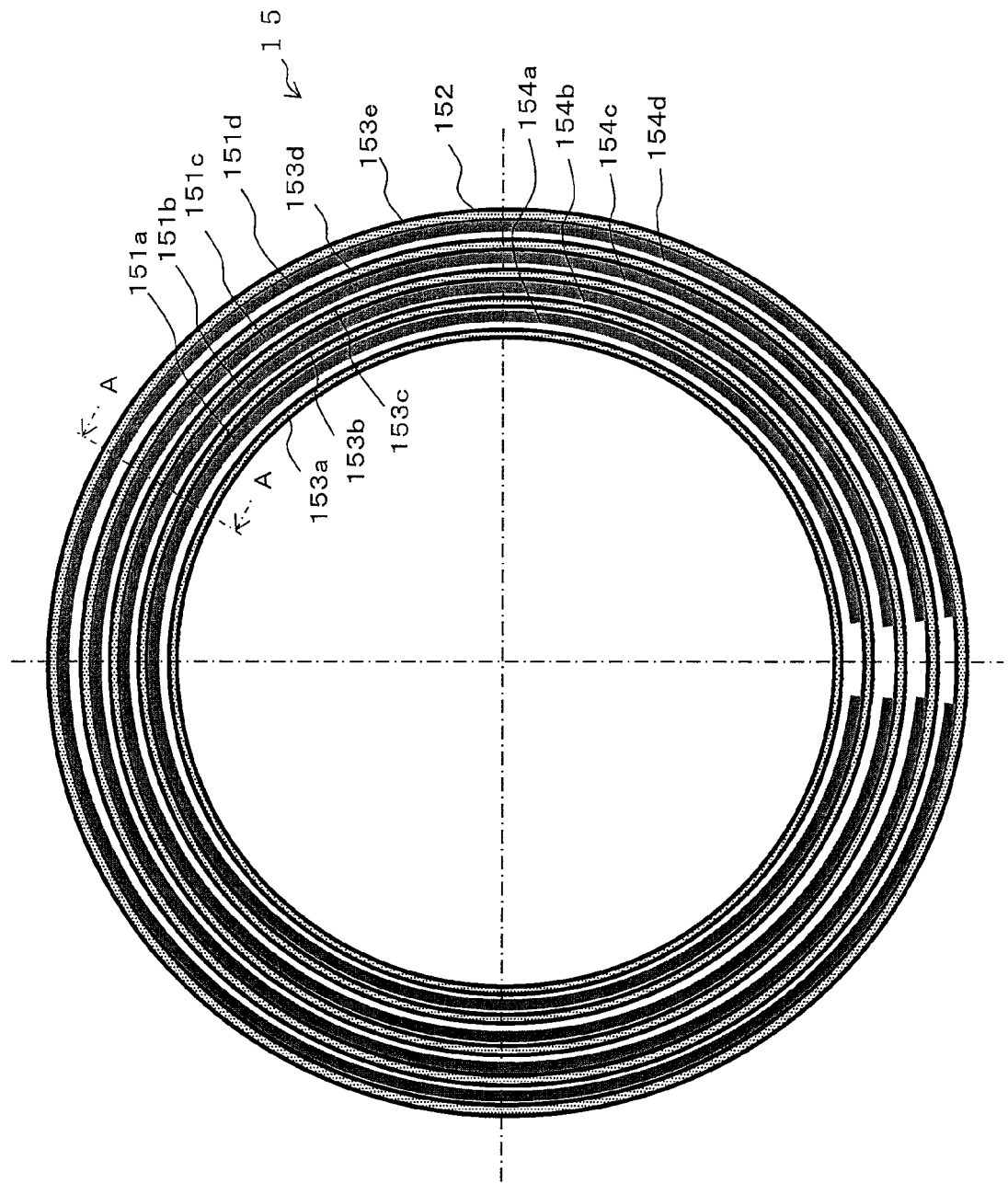
FIG. 2 is a front view for schematically illustrating an example of a wire connection plate unit installed in the rotating electric machine according to the first embodiment of the present invention.
Figure 3:
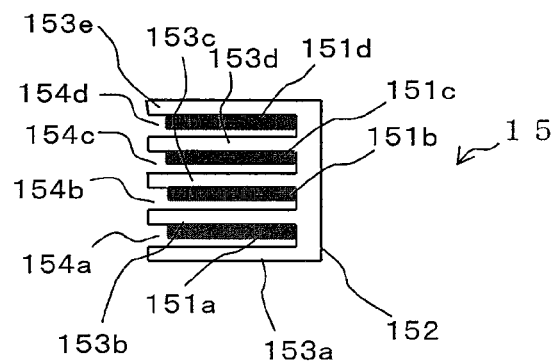
FIG. 3 is a sectional view taken along the line A-A of FIG. 2, for illustrating the example of the wire connection plate unit installed in the rotating electric machine according to the first embodiment of the present invention.

FIG. 2 is a front view for schematically illustrating an example of the wire connection plate unit installed in the rotating electric machine according to the first embodiment of the present invention. FIG. 3 is a sectional view taken along the line A-A of FIG. 2, for illustrating the example of the wire connection plate unit installed in the rotating electric machine according to the first embodiment of the present invention. The front view of FIG. 2 is a view seen from a direction indicated by the arrow B of FIG. 1. Next, with reference to FIG. 2 and FIG. 3, the wire connection plate unit 15 is described in detail.

In FIG. 2, two intersecting dot-dash lines are drawn. A point at which the two dot-dash lines intersect with each other corresponds to a rotation axis of the rotating electric machine 100, that is, a rotation axis of the rotor 2. The rotation axis is aligned with a center of the shaft 21, or substantially the center of the shaft 21. The same applies in the other drawings.

As illustrated in FIG. 2 and FIG. 3, an overall shape of the wire connection plate unit 15 is annular. With this configuration, the wire connection plate unit 15 is mounted to the rotating electric machine 100 so that the shaft 21 is arranged at a center of the wire connection plate unit 15, or at substantially the center of the wire connection plate unit 15. The wire connection plate unit 15 includes bus bars 151a to 151d, which are provided for respective phases, and a holder 152.

When seen from the direction indicated by the arrow B, the bus bars 151a to 151d each have an annular shape with a cutout portion, and have different widths in a radial direction of the shaft 21, that is, different outer diameters and different inner diameters. Each of the bus bars 151a to 151d is connected to the coil 14 of an associated phase. In the first embodiment, the rotating electric machine 100 has four phases, specifically, a U phase, a V phase, a W phase, and an N phase.

The holder 152 is provided for storage of the bus bars 151a to 151d, and includes five wall portions 153a to 153e in total, which are arranged in a comb-like pattern. With this configuration, storage grooves 154a to 154d are defined at different positions in the radial direction of the shaft 21. The storage grooves 154a to 154d are groove-like insertion portions in which the bus bars 151a to 151d are to be respectively inserted for storage. Accordingly, the bus bars 151a to 151d are stored in a concentric manner in the storage grooves 154a to 154d.

In the following, for convenience of description, when a specific bus bar is not referred to, the symbol "151" is used as the symbol denoting the bus bars. Similarly, the symbol "153" and the symbol "154" are used as the symbol denoting the wall portions and the symbol denoting the storage grooves, respectively. Further, unless otherwise specified, the radial direction refers to the radial direction of the shaft 21, and it is assumed that the radial direction is matched with a radial direction of the wire connection plate unit 15, that is, a direction of an array of the storage grooves 154.

The bus bars 151 are each a member obtained by forming a conductive elastic member having a flat plate shape into an annular shape. As illustrated in FIG. 3, an overall sectional shape of each of the storage grooves 154 is a U shape, and one surface in a short-side direction of each of the storage grooves 154 is an opening. As illustrated in FIG. 2 and FIG. 3, a width of each of the storage grooves 154 in the radial direction is larger than a thickness of the bus bar 151. Accordingly, the bus bars 151 can be inserted from the openings into the storage grooves 154, respectively. FIG. 3 is an illustration of a state in which the bus bars 151 are inserted into the storage grooves 154, respectively, and thus are stored in the holder 152.

In FIG. 3, the width of each of the storage grooves 154 in the radial direction is illustrated as a constant width. However, for reasons in manufacture of the holder 152, the width becomes smaller from the opening toward a deep side of the storage groove 154.

Figure 4:
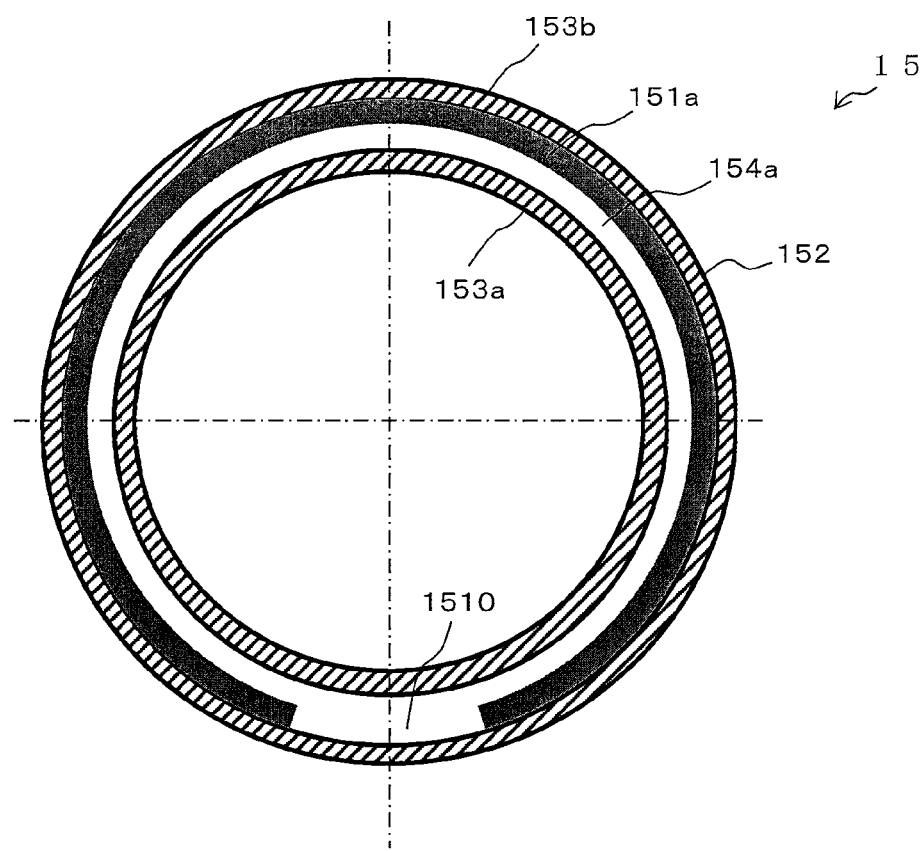
FIG. 4 is a view for illustrating an example of shapes of a storage groove and a bus bar in a radial direction in the first embodiment.

FIG. 4 is a view for illustrating an example of shapes of the storage groove and the bus bar in the radial direction in the first embodiment. Here, with reference to FIG. 4, specific description is made of the shapes of the storage groove 154a and the bus bar 151a in the radial direction, and effects obtained by the shapes. In FIG. 4, in order to avoid confusion, only the storage groove 154a and the bus bar 151a are illustrated.

As illustrated in FIG. 4, an outer surface of the bus bar 151a in the radial direction is entirely held in contact with an inner surface of the wall portion 153b in the radial direction. This is because the bus bar 151a is manufactured so that a width between points on the outer surface of the bus bar 151a in the radial direction is larger than a width between points on the inner surface of the wall portion 153b in the radial direction, in other words, the following relation is satisfied: an outer diameter of the bus bar 151a>an outer diameter of the storage groove 154a. In the following, unless otherwise specified, a positional relationship is represented based on that in the radial direction.

When the width between the points on the surface of the bus bar 151a, and the width between the points on the surface of the wall portion 153b have this relationship, it is required that the bus bar 151a be inserted into the storage groove 154a while the width between the points on the outer surface of the bus bar 151a, that is, the outer diameter of the bus bar 151a is reduced. Accordingly, in the first embodiment, as described above, each of the bus bars 151 is made of the conductive elastic member, and the cutout portion 1510 is formed in each of the bus bars 151. When the cutout portion 1510 is formed, deformation of each of the bus bars 151 involving a change in width in the radial direction is facilitated. As the conductive elastic member, a copper alloy can be exemplified.

After the bus bar 151a is inserted into the storage groove 154a, when a force applied to the bus bar 151a is released, the bus bar 151a expands due to its elasticity. However, in the expanding direction, the wall portion 153b is present. Accordingly, the bus bar 151a expands only until the outer surface of the bus bar 151a comes into contact with the inner surface of the wall portion 153b. As a result, as illustrated in FIG. 4, the deformation of the bus bar 151a due to its elasticity is terminated when the outer surface of the bus bar 151a comes into contact with the inner surface of the wall portion 153b.

To the bus bar 151a in the state illustrated in FIG. 4, an elastic force of pressing the outer surface of the bus bar 151a against the inner surface of the wall portion 153b is applied. A frictional force acting between the bus bar 151a and the wall portion 153b is proportional to the elastic force. Through action of the frictional force generated in accordance with the elastic force, the bus bar 151a inserted in the storage groove 154a maintains the inserted state more stably.

Thus, at the time of assembly of the rotating electric machine 100, falling of the bus bars 151 inserted in the storage grooves 154 is avoided or prevented. Therefore, a worker is not required to repeat the same work performed because of, for example, falling of the bus bars 151, or the number of repetitions of the work is reduced. As a result, a worker can more easily and more quickly perform work of mounting the wire connection plate unit 15 to the rotating electric machine 100, which includes work of inserting the bus bars 151 into the storage grooves 154, respectively. Thus, higher working efficiency is achieved.

After the bus bar 151 is inserted into each of the storage grooves 154, for example, an adhesive is applied to each of the storage grooves 154, and the bus bar 151 is fixed by the adhesive. The bus bar 151 is more stably held in the storage groove 154 due to the elastic force. Thus, a physical force applied to the adhesive by the bus bar 151 is also reduced.

Owing to the reduction in physical force, even in the rotating electric machine 100 after assembly, such a risk is reduced that the bus bars 151 fall out of the holder 152. Thus, frequency of maintenance of the rotating electric machine 100 can be reduced, and the life of the rotating electric machine 100 is increased. Therefore, for a user of the rotating electric machine 100, cost required for the rotating electric machine 100 is reduced.

Figure 5:
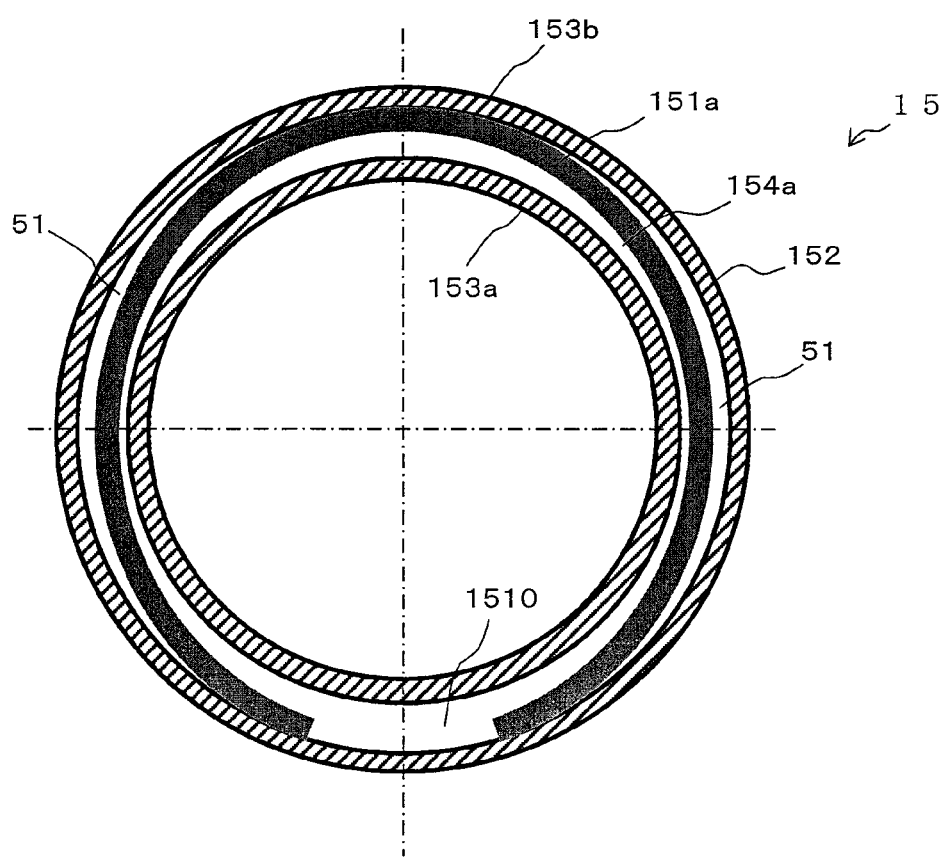
FIG. 5 is a view for illustrating a modification example of the shapes of the storage groove and the bus bar in the radial direction in the first embodiment.

In the first embodiment, as illustrated in FIG. 4, the outer surface of each of the bus bars 151 is entirely held in contact with the outer surface of the storage groove 154, but this configuration is not always required. For example, as illustrated in FIG. 5, a gap 51 may be defined between the outer surface of the bus bar 151a and the inner surface of the wall portion 153b. This is because the elastic force of the bus bar 151a acts on a portion held in contact with the inner surface of the wall portion 153b even when the gap 51 as illustrated in FIG. 5 is defined. The contact portion is reduced, and thus the elastic force acting on the contact portion is increased. Accordingly, the sufficient frictional force can be secured by only the contact portion.

A distance between the bus bars 151 corresponds to an insulation distance. As illustrated in FIG. 2 and FIG. 3, when the plurality of bus bars 151 are arranged in a relatively narrow area, it is preferred that fluctuation of the insulation distance be reduced. In view of this point, it is preferred that, as illustrated in FIG. 4, the outer surface of each of the bus bars 151 be entirely held in contact with the outer surface of the storage groove 154.

The state illustrated in FIG. 5 can be achieved by increasing at least the width between the points on the outer surface of the bus bar 151a in one radial direction as compared to the width between the points on the inner surface of the wall portion 153b in the radial direction. When the bus bar 151a is deformed so that the width between the points on the outer surface of the bus bar 151a in the one radial direction is reduced, due to the elastic force of the bus bar 151a, at least two portions of the bus bar 151a are held in contact with the wall portion 153b. In the bus bar 151a illustrated in FIG. 5 by way of example, when assuming that the elastic member is present also in the cutout portion 1510, the width in the radial direction including a center of the cutout portion 1510 is larger than the width between the points on the inner surface of the wall portion 153b. Accordingly, both end portions of the bus bar 151a are held in contact with the wall portion 153b.

Figure 6:
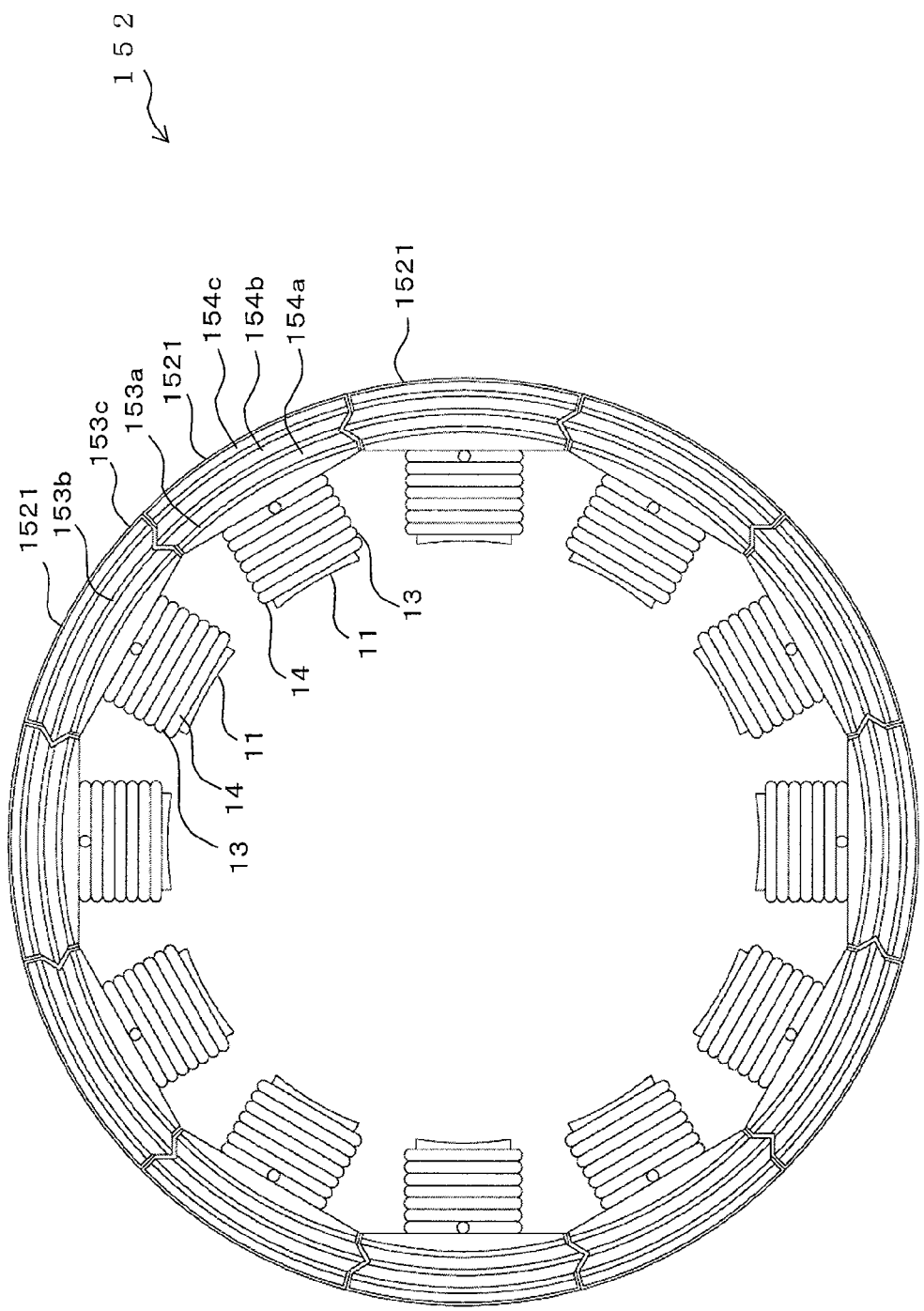
FIG. 6 is a view for illustrating another example of a holder installable in the rotating electric machine according to the first embodiment of the present invention.

In the first embodiment, the holder 152 is manufactured as one part. However, it is not always required that the holder 152 be manufactured as one part. For example, as illustrated in FIG. 6, the holder 152 may be formed of a combination of a plurality of parts 1521. Each of the parts 1521 illustrated in FIG. 6 is integrated with one bobbin 13. Here, the rotating electric machine 100 has three phases, specifically, a U phase, a V phase, and a W phase.

The storage grooves 154a to 154d formed in the holder 152 are arranged in a concentric manner, but it is not always required that the storage grooves 154a to 154d be arranged in a concentric manner. That is, it is not always required that centers of the storage grooves 154a to 154d be matched with each other, and it is not always required that all of the storage grooves 154a to 154d be circular. In other words, it is only required that the storage grooves 154a to 154d each have a shape surrounding the shaft 21 through which the rotation axis passes. The shape surrounding the shaft 21 is not particularly limited. The one radial direction is a direction orthogonal to the rotation axis.

Some rotating electric machines 100 include a rotary component different from the shaft 21. The rotary component different from the shaft 21 is, for example, a boss. Irrespective of types of the rotary components, it is only required that the storage grooves 154a to 154d each have a shape surrounding the rotary component, that is, a shape surrounding the rotation axis.

Second Embodiment

Figure 7:
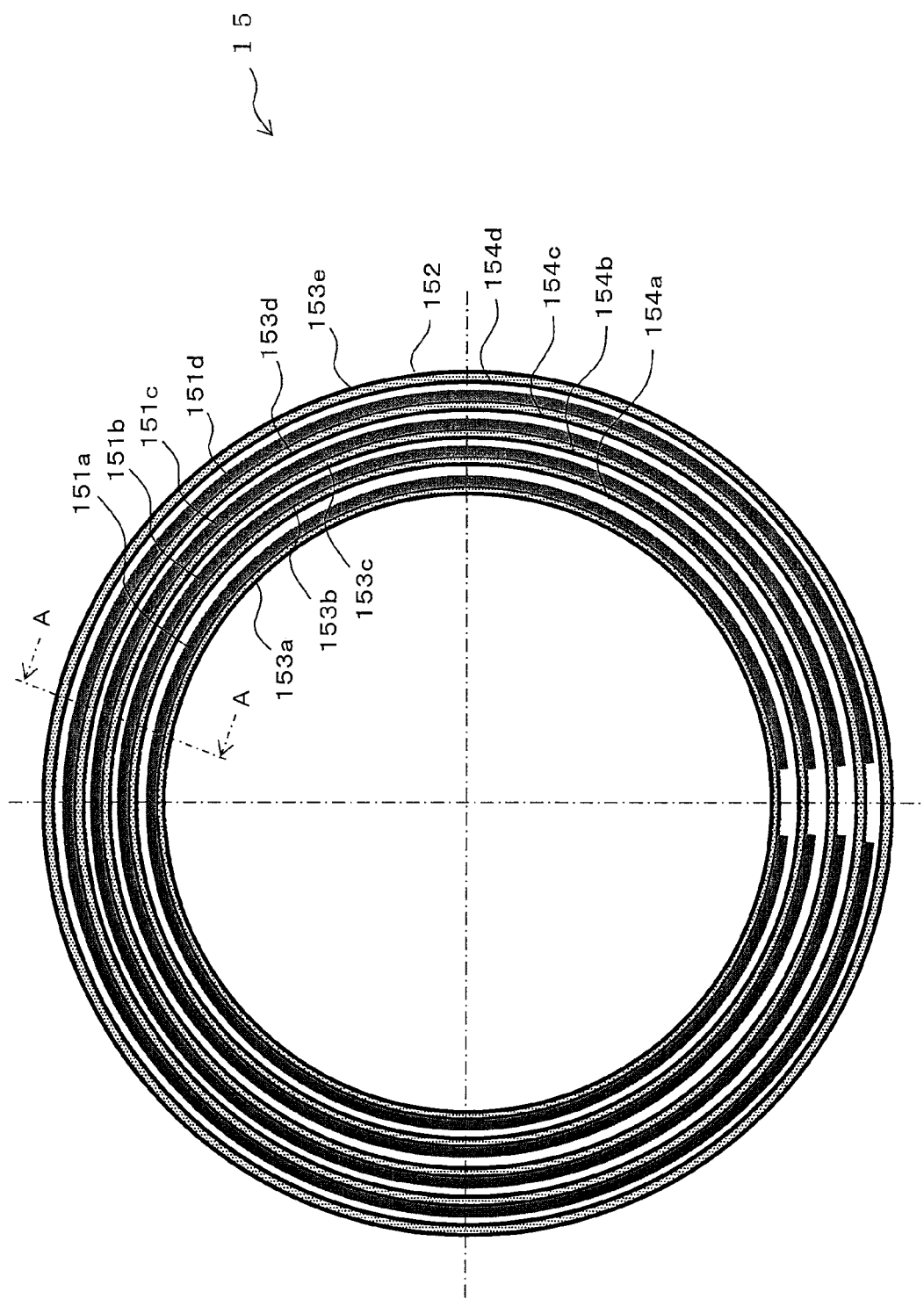
FIG. 7 is a front view for schematically illustrating an example of the wire connection plate unit installed in the rotating electric machine according to a second embodiment of the present invention.
Figure 8:
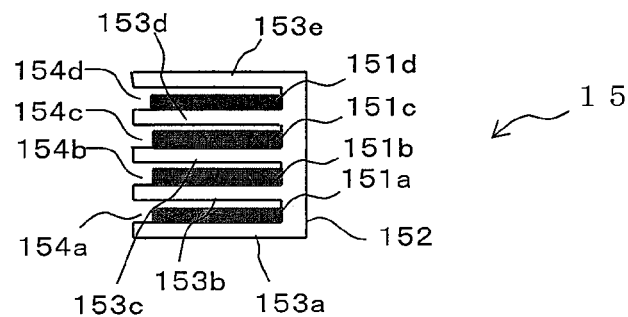
FIG. 8 is a sectional view taken along the line A-A of FIG. 7, for illustrating the example of the wire connection plate unit installed in the rotating electric machine according to the second embodiment of the present invention.

FIG. 7 is a front view for schematically illustrating an example of the wire connection plate unit installed in the rotating electric machine according to a second embodiment of the present invention. FIG. 8 is a sectional view taken along the line A-A of FIG. 7, for illustrating the example of the wire connection plate unit installed in the rotating electric machine according to the second embodiment of the present invention.

In the first embodiment described above, the outer surface of each of the bus bars 151 is entirely held in contact with the outer surface of the storage groove 154. In contrast, in the second embodiment, as illustrated in FIG. 7 and FIG. 8, an inner surface of each of the bus bars 151 is entirely held in contact with an inner surface of the storage groove 154.

Accordingly, each of the bus bars 151 is manufactured so that an inner diameter of the bus bar 151, which is a width between points on the inner surface of the bus bar 151 in the radial direction, is smaller than an inner diameter of the storage groove 154, which is a width between points on the inner surface of the storage groove 154 in the radial direction. For example, regarding the storage groove 154a, the bus bar 151a is manufactured so that a width between points on an inner surface of the bus bar 151a in the radial direction is smaller than a width between points on an outer surface of the wall portion 153a in the radial direction. Thus, each of the bus bars 151 is inserted into the storage groove 154 while the width between the points on the inner surface of the bus bar 151 is increased.

Figure 9:
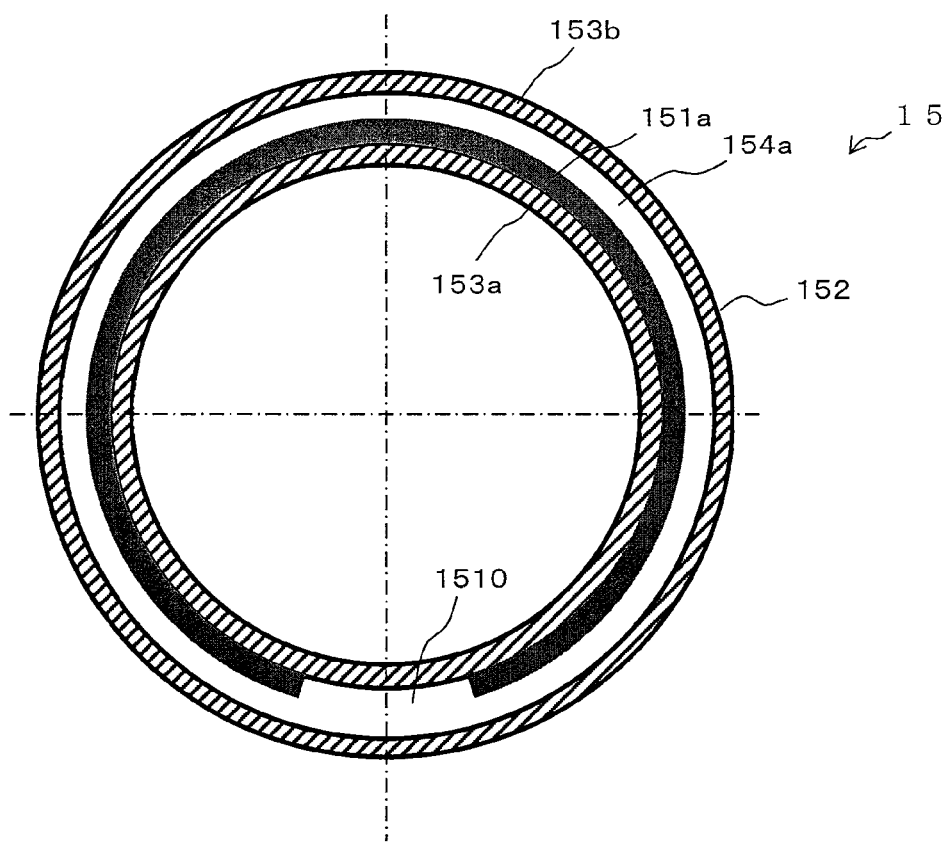
FIG. 9 is a view for illustrating an example of shapes of the storage groove and the bus bar in the radial direction in the second embodiment.

FIG. 9 is a view for illustrating an example of shapes of the storage groove and the bus bar in the radial direction in the second embodiment. Here, with reference to FIG. 9, specific description is made of the shapes of the storage groove 154a and the bus bar 151a in the radial direction, and effects obtained by the shapes. Also in FIG. 9, in order to avoid confusion, only the storage groove 154a and the bus bar 151a are illustrated.

As illustrated in FIG. 9, the inner surface of the bus bar 151a in the radial direction is entirely held in contact with an outer surface of the wall portion 153a in the radial direction. This is because, as described above, the bus bar 151a is manufactured so that a width between points on the inner surface of the bus bar 151a in the radial direction is smaller than a width between points on the outer surface of the wall portion 153a in the radial direction, in other words, the following relation is satisfied: an inner diameter of the bus bar 151a>an inner diameter of the storage groove 154a.

When the width between the points on the surface of the bus bar 151a in the radial direction, and the width between the points on the surface of the wall portion 153a in the radial direction have this relationship, the bus bar 151a is inserted into the storage groove 154a while the width between the points on the inner surface of the bus bar 151a is increased. Accordingly, after the bus bar 151a is inserted into the storage groove 154a, when the force applied to the bus bar 151a is released, the bus bar 151a contracts due to its elasticity. However, in the contracting direction, the wall portion 153a is present. As a result, as illustrated in FIG. 9, deformation of the bus bar 151a due to its elasticity is terminated when the inner surface of the bus bar 151a comes into contact with the outer surface of the wall portion 153a.

To the bus bar 151a in the state illustrated in FIG. 9, an elastic force of pressing the inner surface of the bus bar 151a against the outer surface of the wall portion 153a is applied. Through action of a frictional force generated in accordance with the elastic force, similarly to the first embodiment described above, the bus bar 151a inserted in the storage groove 154a maintains the inserted state more stably. As a result, also in the second embodiment, the same effects as that in the first embodiment described above can be obtained.

Figure 10:
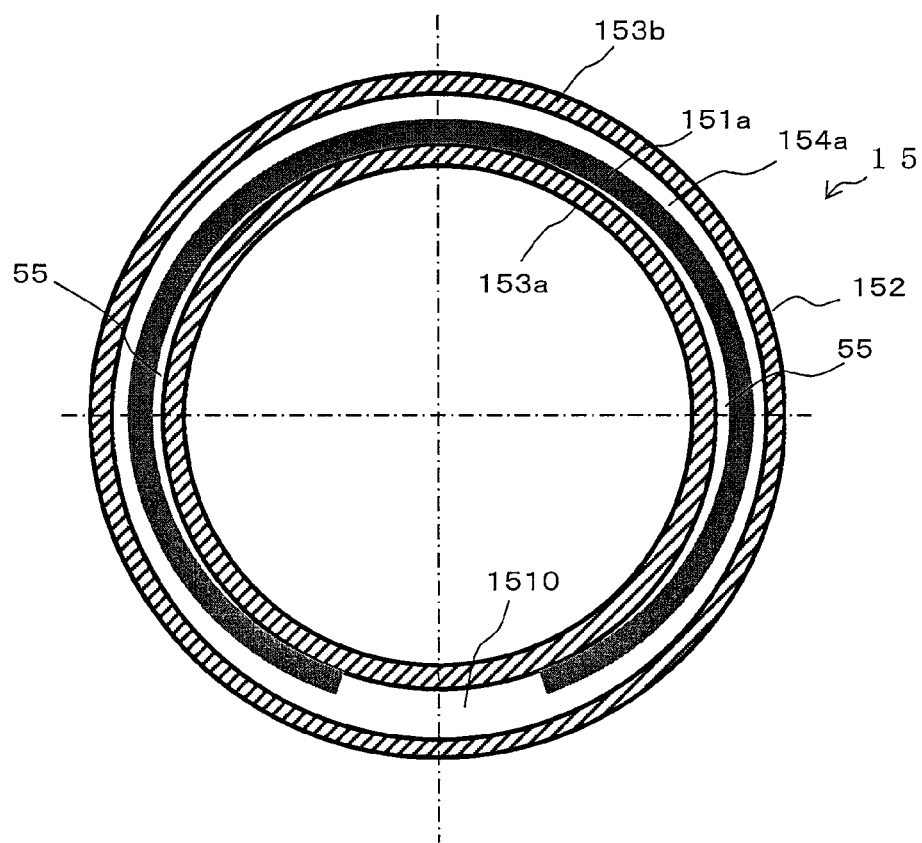
FIG. 10 is a view for illustrating a modification example of the shapes of the storage groove and the bus bar in the radial direction in the second embodiment.

In the second embodiment, as illustrated in FIG. 7 and FIG. 9, the inner surface of each of the bus bars 151 is entirely held in contact with the inner surface of the storage groove 154, but this configuration is not always required. For example, as illustrated in FIG. 10, a gap 55 may be defined between the inner surface of the bus bar 151a and the outer surface of the wall portion 153a. This is because the elastic force of the bus bar 151a acts on a portion held in contact with the outer surface of the wall portion 153a even when the gap 55 as illustrated in FIG. 10 is defined. The contact portion is reduced, and thus the elastic force acting on the contact portion is increased. Accordingly, the sufficient frictional force can be secured by only the contact portion. However, in view of insulation performance, similarly to the first embodiment described above, it is preferred that the inner surface of each of the bus bars 151 be entirely held in contact with the inner surface of the storage groove 154.

The state illustrated in FIG. 10 can be achieved by reducing at least the width between the points on the inner surface of the bus bar 151a in one radial direction as compared to the width between the points on the outer surface of the wall portion 153a in the radial direction. When the bus bar 151a is deformed so that the width between the points on the inner surface of the bus bar 151a in the one radial direction is increased, due to the elastic force of the bus bar 151a, at least two portions of the bus bar 151a are held in contact with the wall portion 153a. In the bus bar 151a illustrated in FIG. 10 by way of example, when assuming that the elastic member is present also in the cutout portion 1510, the width in the radial direction including the center of the cutout portion 1510 is larger than the width between the points on the outer surface of the wall portion 153a. Accordingly, both end portions of the bus bar 151a are held in contact with the wall portion 153a.

Third Embodiment

Figure 11:
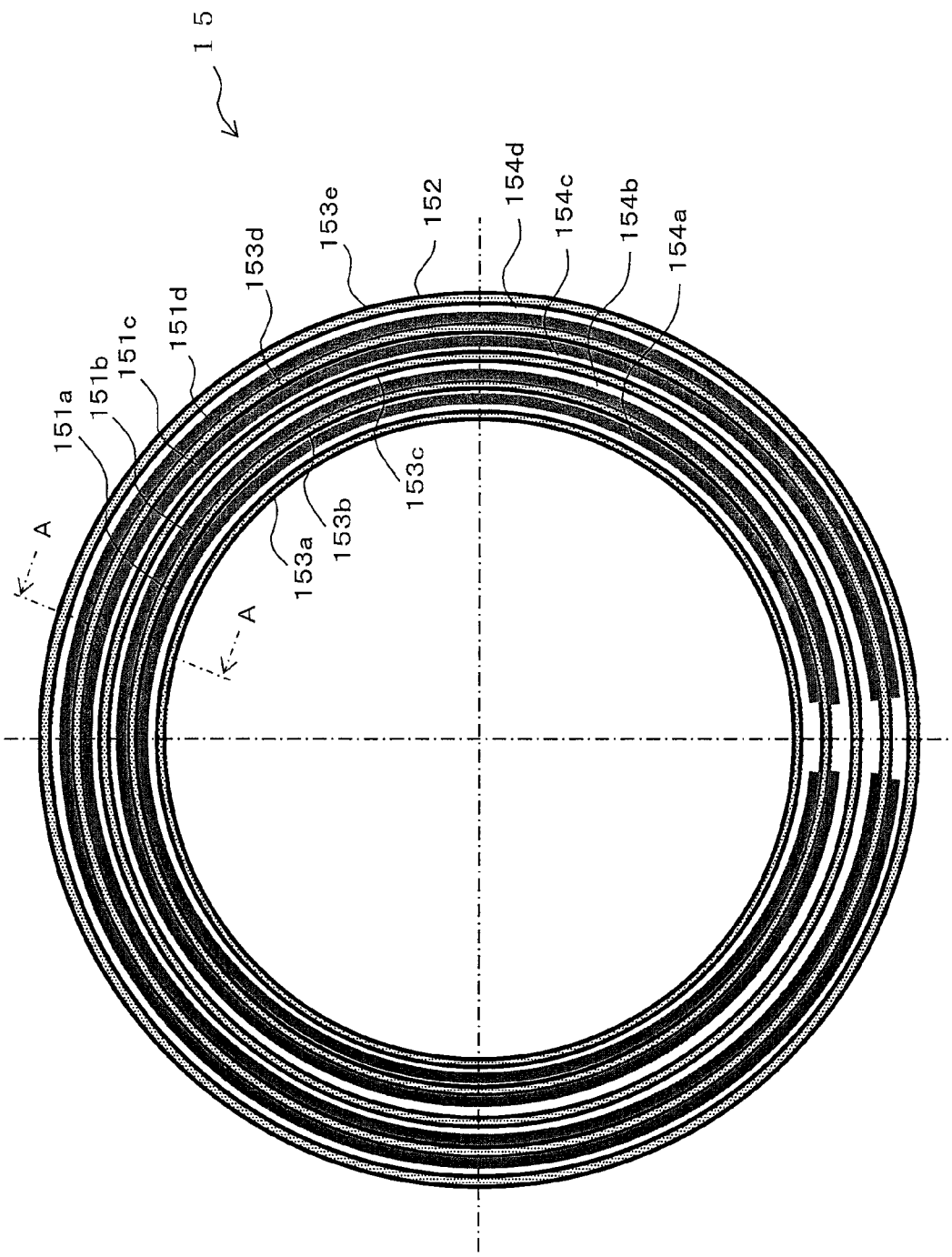
FIG. 11 is a front view for schematically illustrating an example of the wire connection plate unit installed in the rotating electric machine according to a third embodiment of the present invention.
Figure 12:
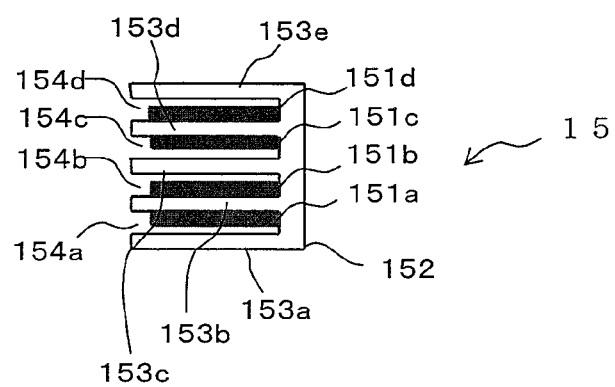
FIG. 12 is a sectional view taken along the line A-A of FIG. 11, for illustrating the example of the wire connection plate unit installed in the rotating electric machine according to the third embodiment of the present invention.

FIG. 11 is a front view for schematically illustrating an example of the wire connection plate unit installed in the rotating electric machine according to a third embodiment of the present invention. FIG. 12 is a sectional view taken along the line A-A of FIG. 11, for illustrating the example of the wire connection plate unit installed in the rotating electric machine according to the third embodiment of the present invention.

In the first and second embodiments described above, the bus bars 151 are held in contact with the storage grooves 154 on the same side of the storage grooves 154. In contrast, in the third embodiment, as illustrated in FIG. 11 and FIG. 12, two bus bars 151 adjacent to each other in the radial direction are held in contact with the storage grooves 154 on different sides of the storage grooves 154. For example, the bus bar 151a is held in contact with the outer surface of the storage groove 154a, and the bus bar 151b is held in contact with the inner surface of the storage groove 154b.

The holder 152 is made of, for example, a resin. In the holder 152 made of a resin, there is a fear in that the wall portions 153 are deformed due to the elastic forces of the bus bars 151. Depending on use conditions, a temperature of an inside of the rotating electric machine 100 is extremely high. As the temperature becomes higher, the wall portions 153 become more liable to be deformed.

When the two bus bars 151 adjacent to each other in the radial direction are held in contact with the storage grooves 154 on the different sides of the storage grooves 154, as illustrated in FIG. 11 and FIG. 12, the different bus bars 151 are held in contact with the outer surface and the inner surface of the same wall portion 153, respectively. Accordingly, the elastic force of the bus bar 151 held in contact with the outer surface of the wall portion 153, and the elastic force of the bus bar 151 held in contact with the inner surface of the wall portion 153 can cancel out each other. When the elastic forces of the two bus bars 151 cancel out each other, deformation of the wall portions 153 is avoided. Alternatively, even when the wall portions 153 are deformed, a deformation amount can be limited to a slight amount. When the deformation of the wall portions 153 is suppressed, the bus bars 151 can be held in the storage grooves 154 more stably.

Fourth Embodiment

Figure 13:
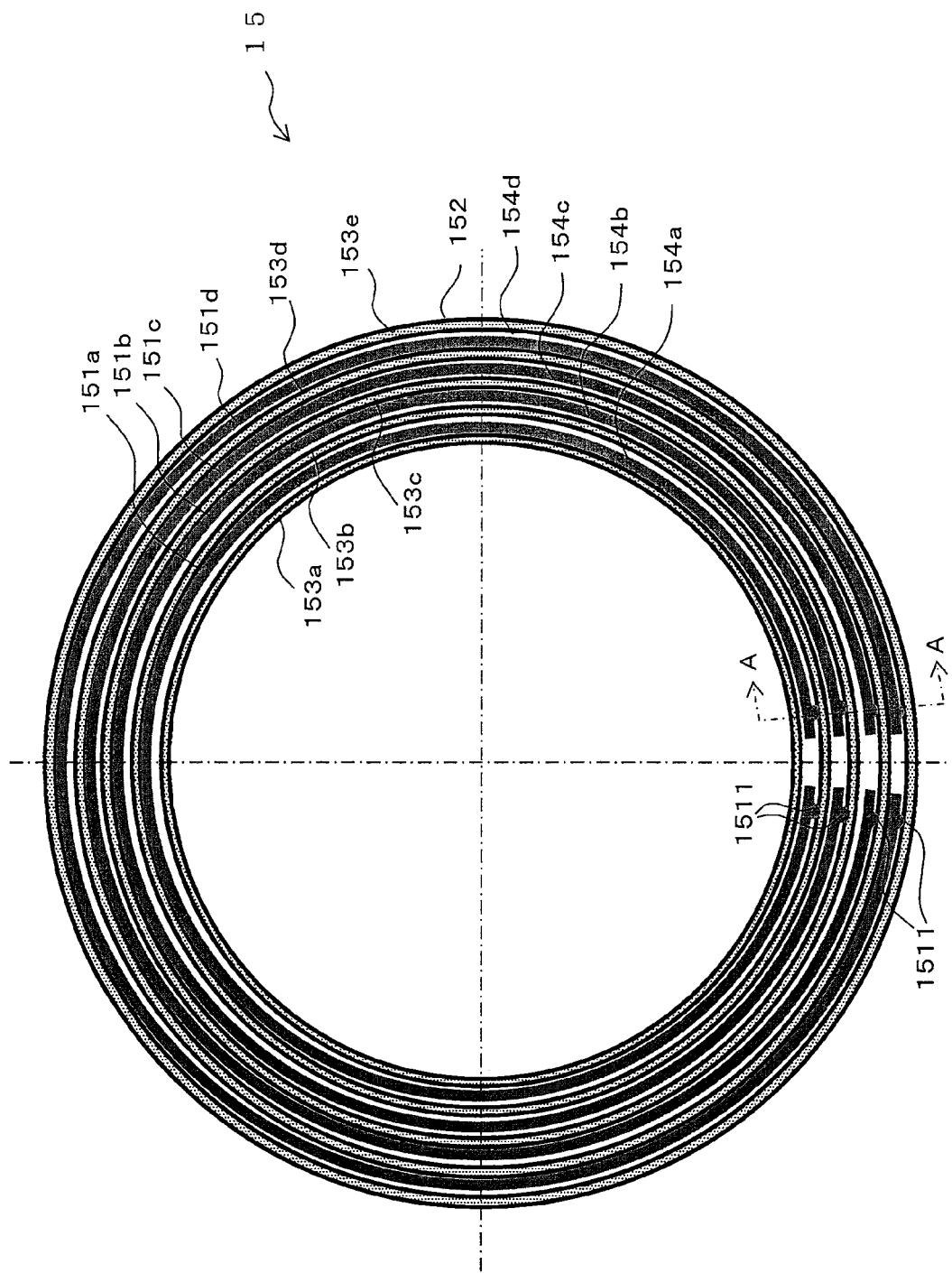
FIG. 13 is a front view for schematically illustrating an example of the wire connection plate unit installed in the rotating electric machine according to a fourth embodiment of the present invention.
Figure 14:
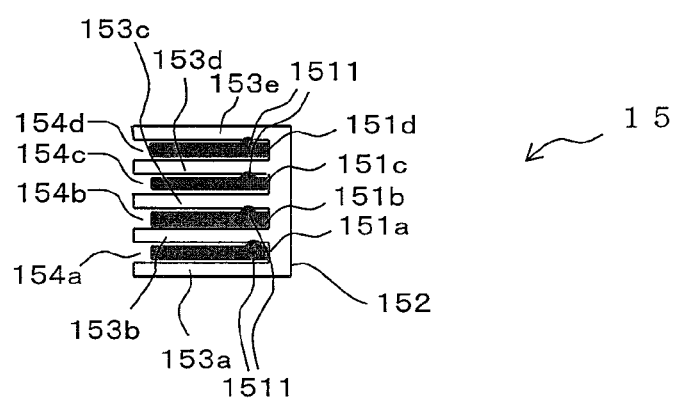
FIG. 14 is a sectional view taken along the line A-A of FIG. 13, for illustrating the example of the wire connection plate unit installed in the rotating electric machine according to the fourth embodiment of the present invention.

FIG. 13 is a front view for schematically illustrating an example of the wire connection plate unit installed in the rotating electric machine according to a fourth embodiment of the present invention. FIG. 14 is a sectional view taken along the line A-A of FIG. 13, for illustrating the example of the wire connection plate unit installed in the rotating electric machine according to the fourth embodiment of the present invention.

In the fourth embodiment, similarly to the first embodiment described above, the width between the points on the outer surface of each of the bus bars 151 in the radial direction is larger than the width between the points on the outer surface of the storage groove 154 in the radial direction. As illustrated in FIG. 13 and FIG. 14, protruding portions 1511 protruding outward are formed on the outer surface of each of the bus bars 151. The protruding portions 1511 correspond to projecting portions.

In the fourth embodiment, the protruding portions 1511 are formed at two end portions of the bus bar 151, respectively. As illustrated in FIG. 13, owing to the two protruding portions 1511, each of the bus bars 151 is held in contact with the outer surface of the storage groove 154 at the two protruding portions 1511, and at a portion opposite to the two protruding portions 1511 in the radial direction.

As illustrated in FIG. 13, owing to presence of the protruding portions 1511, the outer surface of the bus bar 151 has a portion held in non-contact with the outer surface of the storage groove 154. Owing to presence of the non-contact portion, a more intense elastic force is applied to each of the protruding portions 1511, and thus a frictional force acting between each of the protruding portions 1511 and the wall portion 153 is increased. Accordingly, the bus bar 151 can be held in the storage groove 154 more stably.

Figure 15:
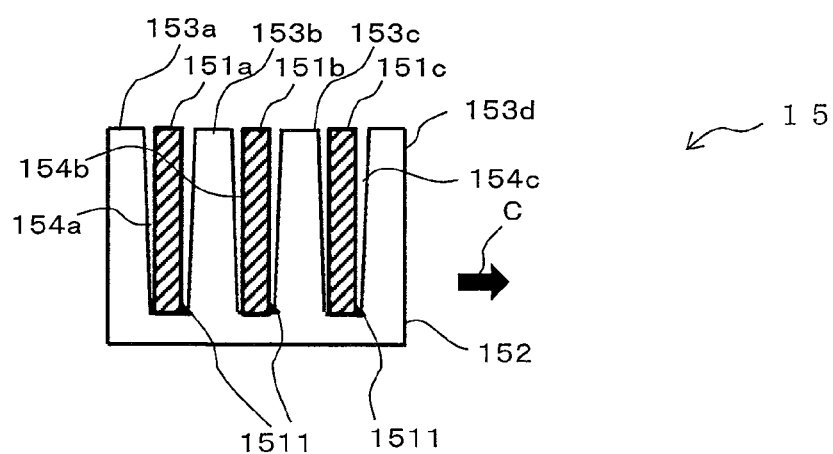
FIG. 15 is a view for illustrating a modification example of protruding portions formed on the bus bars.

The protruding portions 1511 can be formed by, for example, embossing. When burrs are formed in steps of manufacturing the bus bar 151, the burrs may be left as the protruding portions 1511. FIG. 15 is an illustration of an example of a case in which the burrs are left as the protruding portions 1511. The arrow C illustrated in FIG. 15 indicates a direction of the elastic forces acting on the protruding portions 1511. In the example illustrated in FIG. 15, the rotating electric machine 100 has three phases. The burr is also called a raised edge. When the burrs are used as the protruding portions 1511, manufacturing cost of the bus bars 151 can be reduced.

In the fourth embodiment, the protruding portions 1511 are formed on the outer surface of the bus bar 151, but the protruding portions 1511 may be formed on the inner surface of the bus bar 151. When the protruding portions 1511 are formed on the inner surface of the bus bar 151, it is required that the width between the points on the inner surface of each of the bus bars 151 in the radial direction be set smaller than the width between the points on the inner surface of the storage groove 154 in the radial direction.

Fifth Embodiment

Figure 16:
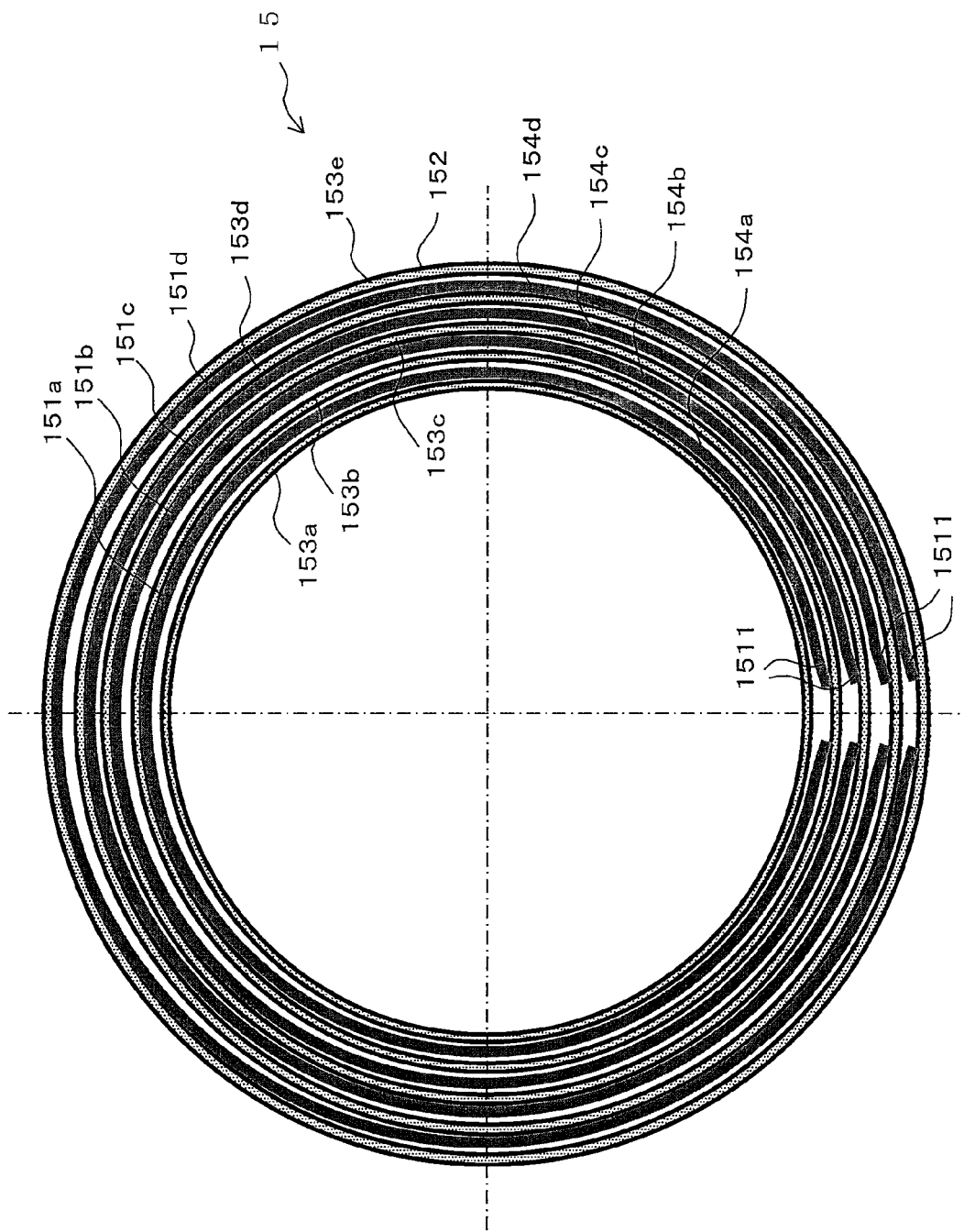
FIG. 16 is a front view for schematically illustrating an example of the wire connection plate unit installed in the rotating electric machine according to a fifth embodiment of the present invention.

FIG. 16 is a front view for schematically illustrating an example of the wire connection plate unit installed in the rotating electric machine according to a fifth embodiment of the present invention.

In the fifth embodiment, both end portions of each of the bus bars 151 are bent outward. With this configuration, in the fifth embodiment, as illustrated in FIG. 16, the both end portions of each of the bus bars 151 serve as the protruding portions 1511. Accordingly, also in the fifth embodiment, similarly to the first embodiment described above, the width between the points on the outer surface of each of the bus bars 151 in the radial direction is larger than the width between the points on the outer surface of the storage groove 154 in the radial direction.

The steps of manufacturing the bus bar 151 may include a bending step of bending the bus bar 151 into a circular shape. The both end portions of the bus bar 151 can be bent outward in the bending step. Accordingly, when the bus bar 151 is manufactured through use of the bending step, the protruding portions 1511 can be formed at lower cost.

The protruding portions 1511 may be formed by bending the both end portions of the bus bar 151 inward. When the protruding portions 1511 are formed by bending the both end portions of the bus bar 151 inward, it is required that the width between the points on the inner surface of each of the bus bars 151 in the radial direction be set smaller than the width between the points on the inner surface of the storage groove 154 in the radial direction. It is preferred that the number of the protruding portions 1511 be set to be equal to or larger than two in order to stably hold the bus bar 151 in the storage groove 154. In view of this point, the number of the protruding portions 1511 may be set to be equal to or larger than three.

In the first to fifth embodiments described above, all of the bus bars 151 have elasticity, but it is not always required that all of the bus bars 151 have elasticity. Further, the outer surface and the inner surface of the storage groove 154 may be formed into different shapes depending on whether or not the bus bar 151 is to be held in contact with the outer surface and the inner surface of the storage groove 154. When the outer surface and the inner surface of the storage groove 154 are formed into different shapes, the elastic force of the bus bar 151 can be more effectively used.

REFERENCE SIGNS LIST

1 stator, 2 rotor, 13 bobbin, 14 coil, 15 wire connection plate unit, 21 shaft, 100 rotating electric machine, 151*a* to 151*d* bus bar, 152 holder, 153*a* to 153*e* wall portion, 154*a* to 154*d* storage groove, 1510 cutout portion, 1511 protruding portion

The invention claimed is:
1. A rotating electric machine, comprising:
a plurality of coils provided in a stator for respective phases;
a plurality of bus bars having elasticity, which are provided for the respective phases and connected to the plurality of coils; and
a holder including a plurality of insertion portions each having a groove shape formed to deform each of the plurality of bus bars,
wherein the plurality of insertion portions are each formed into a shape surrounding a rotation axis of a rotor,
wherein the holder comprises a plurality of wall portions,
wherein at least one of the wall portions is, in one radial direction orthogonal to the rotation axis, between the plurality of bus bars,
wherein a bus bar, which is inserted into at least one of the plurality of insertion portions, has an outer diameter in the one radial direction orthogonal to the rotation axis, and the outer diameter of the bus bar is larger than an inner diameter in the one radial direction of the at least one of the plurality of insertion portions into which the bus bar is inserted,
wherein the inner diameter in the one radial direction of the at least one of the plurality of insertion portions into which the bus bar is inserted is part of a remainder of the at least one of the plurality of insertion portions that is unoccupied by the bus bar,
wherein a second insertion portion, of the insertion portions, has an outer diameter in the one radial direction larger than the inner diameter of the bus bar in the one radial direction, is adjacent to an outer side in the one radial direction of the at least one of the plurality of insertion portions having the inner diameter in the one radial direction of the at least one of the plurality of insertion portions smaller than the outer diameter of the bus bar in the one radial direction.

2. The rotating electric machine according to claim 1, wherein a second outer diameter of a second one of the plurality of bus bars in the one radial direction is larger than a second inner diameter in the one radial direction of a second one of the insertion portions into which the second one of the plurality of bus bars is inserted,
wherein the second inner diameter in the one radial direction of the second one of the plurality of insertion portions into which the second one of the plurality of bus bar is inserted is part of a remainder of the second one of the plurality of insertion portions that is unoccupied by the second one of the plurality of bus bars.

3. The rotating electric machine according to claim 1,
wherein the bus bar, which is inserted into at least one of the plurality of insertion portions, has an inner diameter in the one radial direction orthogonal to the rotation axis, and the inner diameter of the bus bar is smaller than an outer diameter in the one radial direction of the at least one of the plurality of insertion portions into which the bus bar is inserted,
wherein the outer diameter in the one radial direction of the at least one of the plurality of insertion portions into which the bus bar is inserted is a part of a remainder of the at least one of the plurality of insertion portions that is unoccupied by the one of the plurality of bus bars.

4. The rotating electric machine according to claim 3,
wherein a second inner diameter of a second one of the plurality of bus bars in the one radial direction is smaller than a second outer diameter in the one radial direction of a second one of the insertion portions into which the second one of the plurality of bus bars is inserted,
wherein the second outer diameter in the one radial direction of the second one of the insertion portions into which the second one of the plurality of bus bars is inserted is a part of a remainder of the second one of the insertion portions that is unoccupied by the second one of the plurality of bus bars.

5. The rotating electric machine according to claim 1,
wherein at least one of the plurality of bus bars includes a projecting portion protruding in the one radial direction when the at least one of the plurality of bus bars is inserted into the insertion portion.

6. The rotating electric machine according to claim 5,
wherein the projecting portion is formed on the bus bar having an inner diameter in the one radial direction of the at least one of the plurality of insertion portions smaller than an outer diameter of a second one of the insertion portions in the one radial direction.

7. The rotating electric machine according to claim 5,
wherein the projecting portion, which is formed on the bus bar having the outer diameter in the one radial direction larger than the inner diameter of the insertion portion in the one radial direction, protrudes outward in the one radial direction.

8. The rotating electric machine according to claim 5,
wherein two or more projecting portions are formed.

9. The rotating electric machine according to claim 5,
wherein the projecting portion is formed on at least each end portion of the bus bar.

10. The rotating electric machine according to claim 5,
wherein the projecting portion is any one of a burr formed when the bus bar is manufactured, and each bent end portion of the bus bar.

11. The rotating electric machine according to claim 1,
wherein the wall portions are concentric with each other and surround the insertion portions.

12. A rotating electric machine, comprising:
a plurality of coils provided in a stator for respective phases;
a plurality of bus bars having elasticity, which are provided for the respective phases and connected to the plurality of coils; and
a holder including a plurality of insertion portions each having a groove shape formed to deform each of the plurality of bus bars,
wherein the plurality of insertion portions are each formed into a shape surrounding a rotation axis of a rotor,
wherein a bus bar, which is inserted into at least one of the plurality of insertion portions, has an outer diameter in one radial direction orthogonal to the rotation axis, and the outer diameter of the bus bar is larger than an inner diameter in the one radial direction of the at least one of the plurality of insertion portions into which the bus bar is inserted, wherein the inner diameter in the one radial direction of the at least one of the plurality of insertion portions into which the bus bar is inserted is part of a remainder of the at least one of the plurality of insertion portions that is unoccupied by the bus bar, and wherein a second insertion portion, of the insertion portions, has an inner diameter in the one radial direction larger than an outer diameter of the bus bar in the one radial direction, is adjacent to an outer side in the one radial direction of the at least one of the plurality of insertion portions having the inner diameter in the one radial direction of the at least one of the plurality of insertion portions smaller than the outer diameter of the bus bar in the one radial direction.

\* \* \* \* \*